Patented Aug. 11, 1925.

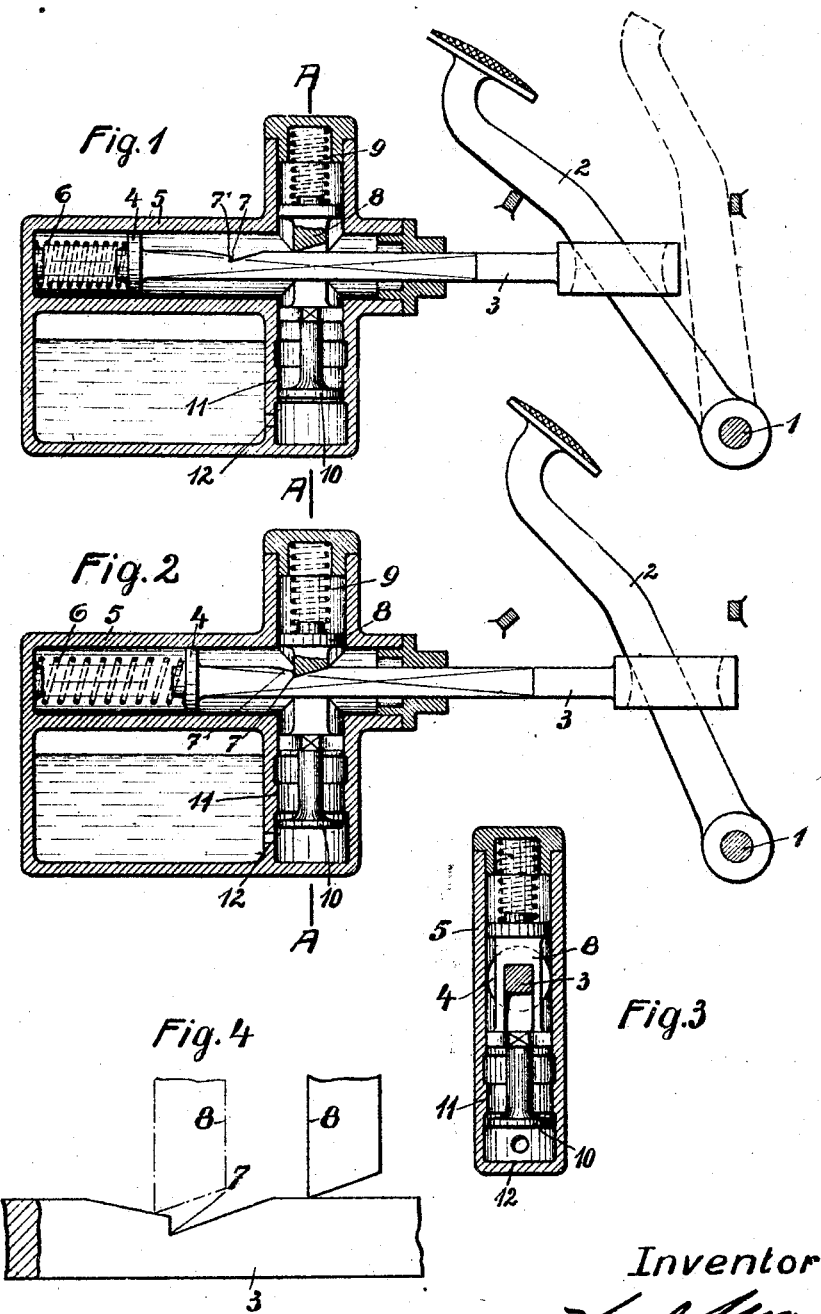

1,549,100

UNITED STATES PATENT OFFICE.

KARL MAYBACH, OF FRIEDRICHSHAFEN, GERMANY, ASSIGNOR TO MAYBACH MOTOR-ENBAU GESELLSCHAFT MIT BESCHRANKTER HAFTUNG, OF FRIEDRICHSHAFEN, GERMANY.

CONTROL-ROD MECHANISM, PARTICULARLY FOR USE IN CHANGE-SPEED GEARS, CHANGE CLUTCHES, AND SO ON, OF MOTOR VEHICLES AND THE LIKE.

Application filed September 5, 1924. Serial No. 736,196.

*To all whom it may concern:*

Be it known that I, KARL MAYBACH, citizen of the German Republic, residing at Friedrichshafen, Bodensee, Germany, have invented certain new and useful Improvements in Control-Rod Mechanism, Particularly for Use in Change-Speed Gears, Change Clutches, and so on, of Motor Vehicles and the like, for which the following is a specification.

The subject of the present invention is a control rod mechanism, particularly for use in change speed gears, change clutches and so on of motor-vehicles and the like, in which the control rod according to the velocity, with which it is moved from the one end position to the other, is held fast and bolted up automatically in an intermediate position or may freely arrive at the other end position.

This object may be secured in such a manner, that f. i. at a slow movement of the control rod from one end position to the other the control rod is held fast by the aid of a locking device in an intermediate position, while at a rapid movement of the control rod the locking device remains inoperative.

For this purpose according to the invention a locking device may be employed, in which the bolt cannot become operative on account of the inertia of its mass, if the control rod is moved rapidly or is connected with a hydraulic brake piston.

The bolt in connection with its notch are shaped in such a manner, that the notch only in one direction is acting in a locking manner, while in the other direction it is not acted upon by the bolt, and that the bolt possesses a certain dead way of incidence with respect to the notch, during which a locking of the notch does not occur. For securing a reliable engagement of the bolt with the notch, the operation of the hydraulic brake piston is preferably compensated totally or partially during the last portion of its stroke.

This result may be obtained f. i. by arranging the hydraulic brake piston in a cylinder, having on the last portion of the piston stroke an enlargement, so that the piston exerts at first an intense braking effect upon the bolt, but after having reached the enlargement makes a rapid movement, favored by the action of a spring, for enabling the bolt to engage with the notch.

The device according to the present invention may be employed for all kinds of control rods, as f. i. for gears, clutches and so on. Especially advantageous is the invention for the control of change clutches of motor vehicles, because it permits, to produce a free run position, which may be passed over or bolted according to requirement, that means a position in which no gear is put in, without complicating the mode of actuating the device itself.

The invention is of special importance for the control of such change clutches, which are controlled by foot-levers, for enabling the automobilist to use his hands only for the steering of the vehicle. In this case only one movement in the forward direction by exerting a pressure is at disposition as controlling movement, and the control lever is moved back in its primary position by the action of a spring when being released.

In this case the invention permits in the simplest manner, to produce a free run position, capable of being locked, by arranging such a gear mechanism with two speeds, controlled by a foot lever, the end positions of which correspond to the direct drive and to a lower speed, in such a manner, that the foot lever, after having been pressed down f. i. to the lower speed, returns to the other end position if being rapidly released, while it will be locked by the bolt in an intermediate position corresponding to the running light of the motor, if the foot lever is slowly released.

The invention will be best understood by reference to the accompanying drawings, wherein:

Fig. 1 shows the locking device in a longitudinal section in that position, in which by pressing down the foot lever the lower speed is put in and the device is in readiness to become operative.

Fig. 2 is the operative position,

Fig. 3 is a cross-section according to line A—A of Fig. 2 and

Fig. 4 shows the notch on a larger scale.

The foot lever 2 rotatably arranged on the axis 1, is connected with the rod 3 of a piston 4, which is movable in a cylinder 5 against the action of a spring 6. The piston rod 3 is provided with a notch 7, the locking edge of which is provided with a bevelment 7' beginning approximately from the middle of its depth, so that it can act in a locking manner only in its lower part. This notch is arranged in the reach of a bolt 8, which is acted upon by a spring 9 and carries a brake piston 10, which moves during a certain part of its stroke in the cylindrical portion 11 of a case, forming an oil tank with the cylinder 5, while it moves during its further stroke in an enlargement 12 of the cylindrical portion 11. By the bevelment 7' a certain dead way of incidence is given to the bolt 8 with respect to the notch 7.

The operation of the device is the following:

If the foot lever 2 is in the position shown in Fig. 1, that means, if it is totally pressed down and f. i. the lower speed is put in, the bolt 8 rests upon the piston rod 3 before the notch 7, and the piston 10 is in the narrower portion of the cylinder 11. The springs 6 and 9 are put under tension. If now the foot-lever is released, the spring 9 tends to move downwards the bolt 8. This tendency of the spring 9 is, however, opposed by the brake piston 10, by retarding at first the movement of the bolt 8, until it arrives at the enlarged portion 12 of the cylinder. In this moment the spring 9 is able to shoot suddenly the bolt 8 when the notch 7 arrives below the bolt 8 by releasing slowly the foot lever 2 as the piston 10 does not find any resistance, because the oil may flow without ado above the piston. The piston rod is therefore bolted in the position shown in Fig. 2, if the foot lever is slowly released.

If, however, the foot lever is rapidly released, the notch 7, owing to the retarded movement of the bolt 8, slides freely below the latter (Fig. 4) or the bolt 8 strikes upon the bevelment 7' of the notch, so that the foot lever is able to return to the position, shown by dotted lines in Fig. 1, in which the direct drive is put in.

From the locked position (Fig. 2) the foot lever 2 can return to the rest position only, after having been brought into the position of Fig. 1, because the notch does not act in a locking manner in this direction of movement so that it is not possible, to put in the direct drive from the free run position.

What I claim is:

1. In control rod mechanism, particularly for use in change speed gears, change clutches and so on of motor vehicles and the like the combination of a control lever, the end positions of which correspond to two speeds (f. i. to the direct drive and to a lower speed), a rod, connected with said control lever, means for pressing said rod together with said lever into one end position, a notch in said rod, a locking device and means for causing said locking device to co-operate with said notch and lock the said rod in an intermediate position or not, according as the control lever is released slowly or rapidly.

2. In control rod mechanism, the combination of a control lever, the end positions of which correspond to two speeds (f. i. to the direct drive and to a lower speed), a rod, connected with said control lever, means for pressing said rod together with said lever into one end position, a notch in said rod, a locking device, means for causing said locking device to co-operate with said notch and lock the said rod in an intermediate position or not, a brake cylinder, and a brake piston therein, connected with said locking device, and designed to retard the movement of said locking device.

3. In control rod mechanism, the combination of a control lever, the end positions of which correspond to two speeds (f. i. to the direct drive and to a lower speed, a rod, connected with said control lever, means for pressing said rod together with said lever into one end position, a notch in said rod, a locking device, means for causing said locking device to cooperate with said notch and lock the said rod in an intermediate position or not, a brake cylinder, an enlargement in the diameter of said cylinder and a brake piston connected with said locking device and movable in said cylinder in such a manner, that it retards the movement of the locking device on the first part of its stroke, but after reaching the said enlargement, admits an accelerated movement of the locking device for engaging the same with said notch.

4. In control rod mechanism, the combination of a control lever, the end positions of which correspond to two speeds (f. i. to the direct drive and to a lower speed), a rod, connected with said control lever, means for pressing said rod together with said lever into one end position, a notch in said rod, acting only in one direction in a locking manner, a locking device, means for causing said locking device to cooperate with said notch and lock the said rod in an intermediate position or not, a brake cylinder, an enlargement in the diameter of said cylinder and a brake piston connected with said locking device and movable in said cylinder in such a manner, that it retards the movement of the locking device on the first part of its stroke, but after reaching the said enlargement, admits an accelerated movement of the locking device for engaging the same with said notch.

5. In control rod mechanism, the combination of a control lever, the end positions of which correspond to two speeds (f. i. to the direct drive and to a lower speed) a rod, connected with said control lever, means for pressing said rod together with said lever into one end position, a notch in said rod, acting only in one direction in a locking manner, a bevelment extending approximately from the middle of the locking edge of the notch a locking device, means for causing said locking device to cooperate with said notch and lock the said rod in an intermediate position or not, a brake cylinder, an enlargement in the diameter of said cylinder and, a brake piston connected with said locking device and movable in said cylinder in such a manner, that it retards the movement of the locking device on the first part of its stroke, but after reaching the said enlargement, admits an accelerated movement of the locking device for engaging the same with said notch.

6. In control rod mechanism, the combination of a control lever, the position of rest of which corresponds to the direct drive and its end position corresponds to the lower speed drive and its intermediate position corresponds to the running light of the motor, a piston rod, connected with said control lever, a spring, pressing said piston rod together with said control lever into one end position, a notch in said rod, having a beveled locking edge, a locking bolt, a spring causing said bolt to cooperate with said notch and lock the said rod in an intermediate position or not, according as the control lever is released slowly or rapidly, a brake cylinder filled with a liquid, an enlargement in the diameter of said cylinder, and a brake piston, connected with said locking bolt and movable in said cylinder in such a manner that it retards the movement of the locking bolt on the first part of its stroke, but after reaching the said enlargement admits an accelerated movement of the locking bolt for engaging the same with the notch.

KARL MAYBACH.